United States Patent
Ishida

(10) Patent No.: US 7,963,622 B2
(45) Date of Patent: Jun. 21, 2011

(54) LIQUID DISCHARGING DEVICE AND ELECTRO OPTIC DEVICE

(75) Inventor: Kohei Ishida, Suwa (JP)

(73) Assignee: Seiko Epson Corporation (JP)

( * ) Notice: Subject to any disclaimer, the term of this patent is extended or adjusted under 35 U.S.C. 154(b) by 810 days.

(21) Appl. No.: 11/947,864

(22) Filed: Nov. 30, 2007

(65) Prior Publication Data
US 2008/0132140 A1    Jun. 5, 2008

(30) Foreign Application Priority Data

Dec. 1, 2006  (JP) ................... 2006-325279

(51) Int. Cl.
*B41J 29/38* (2006.01)
(52) U.S. Cl. ............... 347/12; 347/9; 347/10; 347/40; 347/41; 347/43
(58) Field of Classification Search ............ 347/9–12, 347/15, 40–43
See application file for complete search history.

(56) References Cited

U.S. PATENT DOCUMENTS

| | | | |
|---|---|---|---|
| 6,997,553 B2 | 2/2006 | Tung | |
| 7,360,856 B2 | 4/2008 | Ochiai et al. | |
| 7,448,709 B2 | 11/2008 | Nakajima et al. | |
| 2005/0243128 A1* | 11/2005 | Nakajima et al. | 347/41 |

FOREIGN PATENT DOCUMENTS

| | | |
|---|---|---|
| JP | 2002-292847 | 10/2002 |
| JP | 2003-233476 * | 8/2003 |
| JP | 2004-347694 | 12/2004 |
| JP | 2006-159698 | 6/2006 |

* cited by examiner

*Primary Examiner* — Matthew Luu
*Assistant Examiner* — Henok Legesse
(74) *Attorney, Agent, or Firm* — Harness, Dickey & Pierce, P.L.C.

(57) ABSTRACT

A liquid droplet-discharging device comprises: a droplet-discharging head having a plurality of nozzles that are arranged in a predetermined direction and discharge liquid droplets; a scanning unit for relatively moving the droplet-discharging head and a substrate toward a scanning direction: a memory memorizing pattern data corresponding to driving nozzles that are selected from the plurality of nozzles in each of a plurality of discharged regions, by partitioning a drew region of the substrate into the plurality of discharged regions every discharging frequency along a scanning direction of the substrate; a transferring unit for developing the patterned data memorized by the memory into a plurality of data to be divided and transferring the divided data to the liquid droplet-discharging head in order; and an output unit for outputting a driving signal that drives a driving nozzle selected by the divided data to discharge the liquid droplets. The patterned data are data that allocates the plurality of nozzles to a plurality of blocks and corresponds each of the plurality of blocks to each of the plurality of discharging regions.

3 Claims, 6 Drawing Sheets

| STATE | NOZZLE NUMBER | | |
|---|---|---|---|
| | $3n+1$ | $3n+2$ | $3n+3$ |
| $3m+1$ | 1 | 0 | 0 |
| $3m+2$ | 0 | 1 | 0 |
| $3m+3$ | 0 | 0 | 1 | n AND m ARE INTEGER
MORE THAN AND EQUAL TO 0.

| STATE | NOZZLE NUMBER | |
|---|---|---|
| | 2n+1 | 2n+2 |
| 2m+1 | 1 | 0 |
| 2m+2 | 0 | 1 | n AND m ARE INTEGER
MORE THAN AND EQUAL TO 0.

| STATE | NOZZLE NUMBER | | | |
|---|---|---|---|---|
| | 4n+1 | 4n+2 | 4n+3 | 4n+4 |
| 4m+1 | 1 | 0 | 0 | 0 |
| 4m+2 | 0 | 0 | 1 | 0 |
| 4m+3 | 0 | 1 | 0 | 0 |
| 4m+4 | 0 | 0 | 0 | 1 | n AND m ARE INTEGER
MORE THAN AND EQUAL TO 0.

LIQUID DISCHARGING DEVICE AND ELECTRO OPTIC DEVICE

BACKGROUND OF THE INVENTION

1. Technical Field

A present invention relates to a droplet-discharging device and an electro optic device.

2. Related Art

A liquid crystal display generally comprises oriented liquid crystal molecules and an orientational film made of orientational polymer such as orientational polyimide, which arranges orientation of liquid crystal molecules. An ink jet method using a droplet-discharging head is applied to a process for manufacturing the oriented film in order to improve productivity and reduce a manufacturing cost. (see JP-A-2004-347694.)

The droplet-discharging head comprises a plurality of cavities storing liquid, a plurality of nozzles arranged in a row and connected to cavities, and a plurality of actuators such as piezoelectric elements and resistive heating elements. The droplet-discharging head receives input signals that commonly drive an actuator selected among a plurality of actuators based on drawing data and discharges liquid droplets from a nozzle corresponding to each actuator. An inkjet method forms the oriented film by applying a material for the oriented film to a droplet-discharging head, discharging liquid droplets including orientational polymer molecules to a substrate and drying liquid droplets landed on a substrate.

In an inkjet method, a droplet-discharging head relatively moves toward a predetermined scanning direction against a substrate to which droplets are discharged and each of actuators receives above driving signals with a predetermined discharging frequency. Such method draws a pattern of a liquid body in order along a scanning direction on a substrate where a pattern is drawn by discharging liquid droplets of which amount corresponds to numbers of arranged nozzles with a predetermined discharging frequency in order.

A droplet-discharging head provides a liquid body to all nozzles from a common single tank. Such providing, however, causes a following problem. Namely, when a droplet-discharging head discharges many liquid droplets from nozzles at a same time, different flow channel resistances among nozzles cause different supplying pressures of liquid droplets, yielding a crosstalk among adjacent nozzles, and largely fluctuating discharging amounts of liquid droplets among nozzles. As a result, relatively large sized droplets or relatively small sized droplets are continuously discharged along a scanning line, forming thickness steps along a scanning line of a droplet-discharging head and remarkably deteriorating display quality of an liquid crystal display.

SUMMARY

An advantage of a present invention is to provide a droplet-discharging head that improves thickness uniformity of film patterns formed by discharging liquid droplets and an electro optic device manufactured by the head.

A droplet-discharging device according to an aspect of the invention includes: a droplet-discharging head having a plurality of nozzles that are arranged in a predetermined direction and discharge liquid droplets; a scanning unit for relatively moving the droplet-discharging head and a substrate toward a scanning direction: a memory memorizing pattern data corresponding to driving nozzles that are selected from the plurality of nozzles in each of a plurality of discharged regions, by partitioning a drew region of the substrate into the plurality of discharged regions every discharging frequency along a scanning direction of the substrate; a transferring unit for developing the patterned data memorized by the memory into a plurality of data to be divided and transferring the divided data to the liquid droplet-discharging head in order; and an output unit for outputting a driving signal that drives a driving nozzle selected by the divided data to discharge the liquid droplet. The patterned data are data that allocates the plurality of nozzles to a plurality of blocks and corresponds each of the plurality of blocks to each of the plurality of discharged regions.

In the droplet-discharging device according to the aspect of the invention, nozzles allocated into a plurality of blocks discharge liquid droplets into different discharged regions each of which is partitioned along the scanning line. Hence, overlapping of discharging timing can be reduced by numbers of blocks, constraining fluctuation of the volume of discharging liquid droplets due to simultaneous discharging. As a result, the volumes of discharging liquid droplets can be uniformed every nozzle, improving thickness uniformity of a film pattern formed by discharging liquid droplets.

According to the aspect of the invention as the droplet-discharging device, the patterned data may be data that allocates each of nozzles located adjacently located each other to each of different blocks and makes each of the plurality of blocks correspond to each of the plurality of discharged regions.

In the droplet-discharging device, each of adjacent nozzles discharges liquid droplets every different discharging timing. Such different discharging timing can certainly avoid cross talk among nozzles. Accordingly, thickness uniformity of a film pattern formed by discharging liquid droplets can be improved.

According to the aspect of the invention, the droplet-discharging device may further comprise a receiving unit for receiving drawing data from an outside computer and a developing unit for developing the drawing data received by the receiving unit to the patterned data.

According to this droplet-discharging device, the developing unit develops the drawing data to the patterned data. Hence, usability of the droplet-discharging device can be further improved, compared to a case of generating patterned data with a separated outside device.

According to a second aspect of the invention, an electro optic device comprises a thin film formed by processes in that the above mentioned droplet-discharging device discharges liquid droplets on the substrate and the liquid droplets are dried.

The electro optic device according to the second aspect of the invention includes various thin films having improved thickness uniformity and improved its optical characteristics.

BRIEF DESCRIPTION OF DRAWINGS

The invention will be described with reference to a accompanying drawings, wherein like numbers reference like elements.

FIG. 7 is a diagram explaining dot pattern data.

FIG. 8 is a diagram explaining dot pattern data.

DESCRIPTION OF EXEMPLARY EMBODIMENTS

Figure 1:
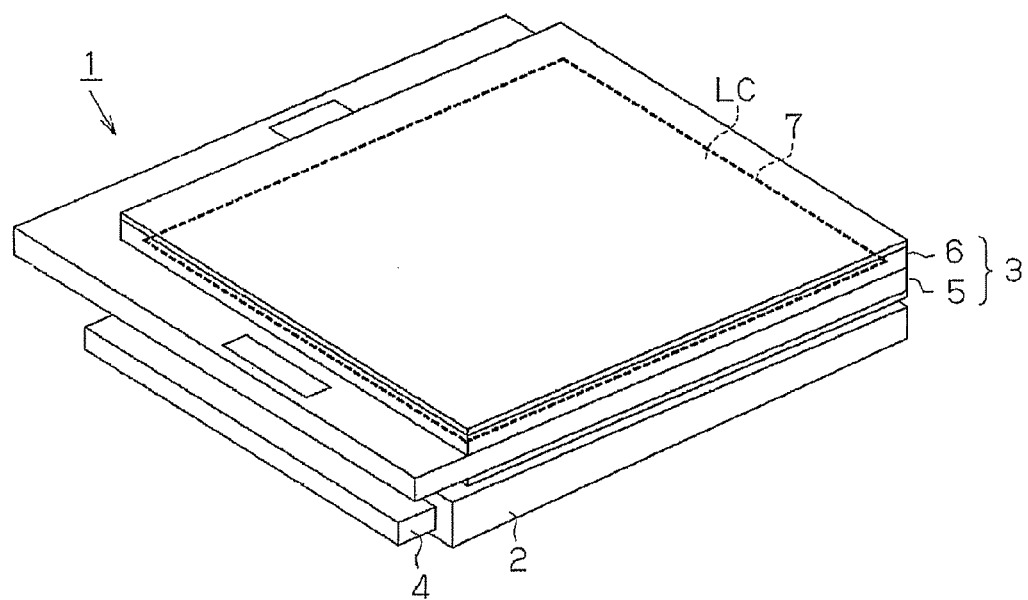
FIG. 1 is a perspective view of a liquid crystal display.
Figure 2:
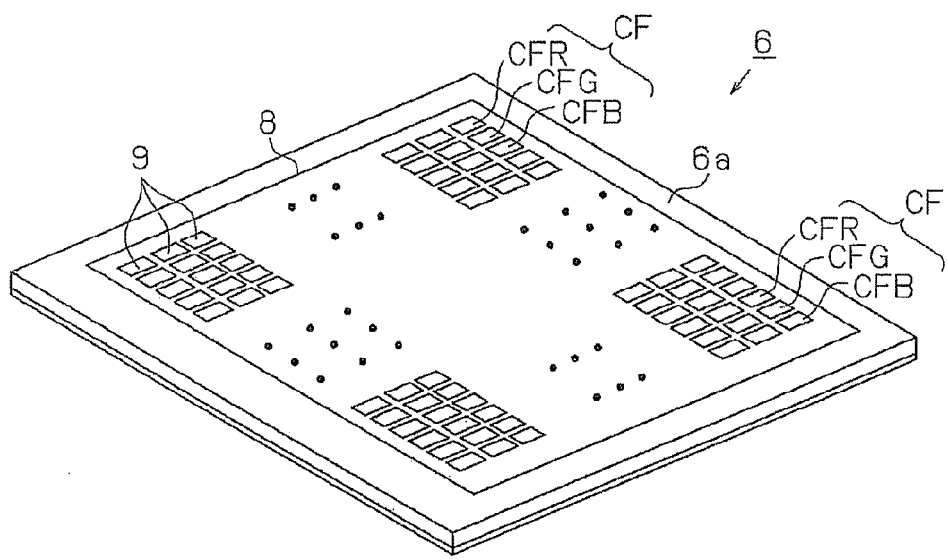
FIG. 2 is a perspective view explaining an oriented film.

Embodiments of a invention will be described with reference to the accompanied drawings from FIG. 1 to FIG. 9. First, a liquid crystal display 1 as an electro optic device is explained. FIG. 1 is a perspective view of a liquid crystal display. FIG. 2 is a perspective view showing a color filter substrate provided with the liquid crystal display.

As shown in FIG. 1, a liquid crystal display 1 comprises a backlight 2 and a liquid crystal panel 3. The backlight 2 irradiates an entire surface of the liquid crystal panel 3 with light emitted from a light source 4. The liquid crystal panel 3 comprises a element substrate 5, a color filter substrate 6, a sealing member 7 having rectangular frame for attaching these two substrates together and a liquid crystal LC encapsulated between these two substrates. The liquid crystal LC displays desired images on an upper surface of the color filter substrate 6 by modulating light from the backlight 2.

In FIG. 2, a light shielding layer 8 having a grid shape and may spaces (pixels 9) surrounded by the light shielding layer 8 are formed on the upper surface of the color filter substrate 6 (the lower surface of FIG. 1: side surface opposing the element substrate 5.) The light shielding layer 8 made of a resin including a material for shielding such as chromium and carbon shields light passed through the liquid crystal LC. A color filter CF passing light, which has a specific frequency, is formed within each pixel 9. The color filter CF comprises a red filter CFR passing red light, a green filter CFG passing green light and a blue filter CFB passing blue light, for example.

An oriented film OF covering an entire surface of the color filter substrate 6 and contacting with the liquid crystal LC is formed on the upper surface of the color filter CF. The oriented film OF is made of orientational polymer molecules such as orientational polyimide. The oriented film OF is formed by treating orientation such as rubbing and regulates orientation of contacted liquid crystal molecules. The oriented film OF is further formed by a liquid droplet-discharging head of the embodiment. Namely, a material for an oriented film (ink Ik for an oriented film), in which orientational polymer molecules are dispersed, is discharged to the surface of the color filter substrate 6 and landed liquid droplets are dried. This process forms the oriented film OF.

Figure 3:
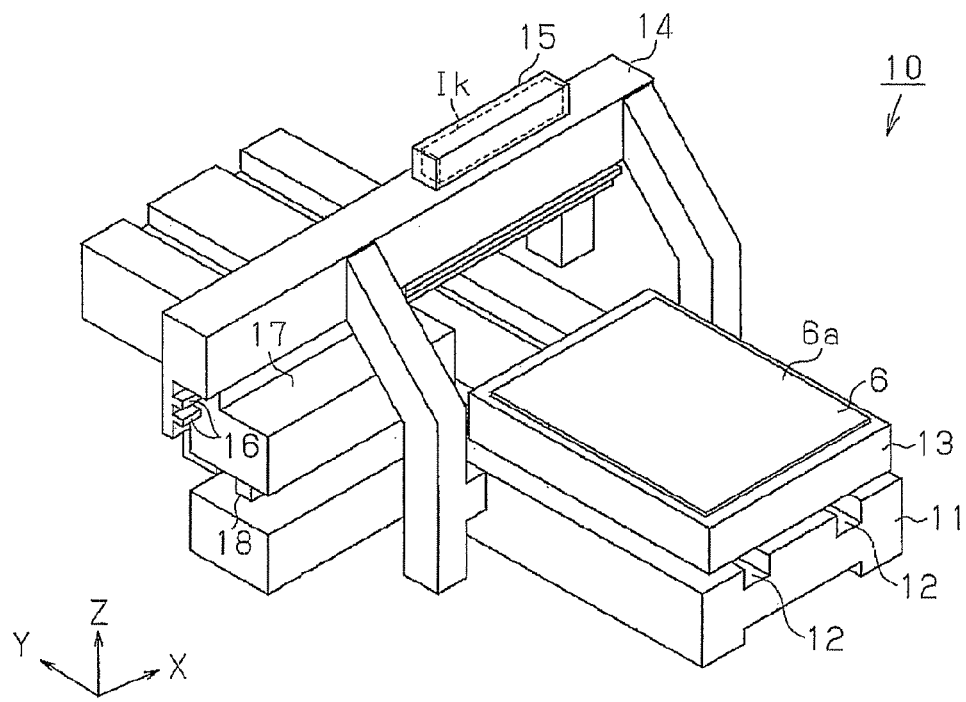
FIG. 3 is a perspective view explaining a liquid droplets discharging device.

Here, a region of a discharged surface 6a in which the oriented film OF is formed is defined as a drew region. Next, a liquid droplet-discharging device for forming the oriented film OF will be explained. FIG. 3 is an overall perspective view of a droplet-discharging device.

As shown in FIG. 3, the droplet-discharging device 10 includes a base 11 having a rectangular shape. A pair of guiding grooves 12 is formed on the surface of the base 11 as extending to the longitudinal direction (Y direction) and a substrate stage 13 is installed in the pair of guiding grooves 12 as a scanning unit. The substrate stage 13 is connected to an output axis of a stage motor installed on the base 11. The color filter substrate 6 is mounted on the substrate stage 13 as having a state in which a discharged surface 6a is upper side and placed at a fixed position by the stage 13. The substrate stage 13 is scanned along the guiding groove 12 by a stage motor normally or reversely rotating and scans the color filter substrate 6 toward the Y direction.

A guiding member 14 having a gate shape is bridged over the upper surface of the base 11 along the X direction perpendicular to the Y direction. An ink tank 15 is installed on the upper side of the guiding member 14. The ink tank 15 stores a liquid body (ink Ik for an orientational film) in which a material for a filter is included and derives the ink Ik for an orientational film with a predetermined pressure.

A pair of upper and lower guiding rails 16 extending the X direction is formed in the guiding member 14 and a carriage 17 is installed in the pair of upper and lower guiding rails 16, which is connected to and driven by the output axis of a carriage motor installed in the guiding member 14. A plurality of liquid droplet-discharging heads 18 arranged toward the X direction (simply called as a discharging head 18) is mounted on the lower side of the carriage 17. The carriage 17 is scanned along the guiding rail 16 by a carriage motor normally or reversely rotating and scans the discharging head 18 toward the X direction.

Figure 4:
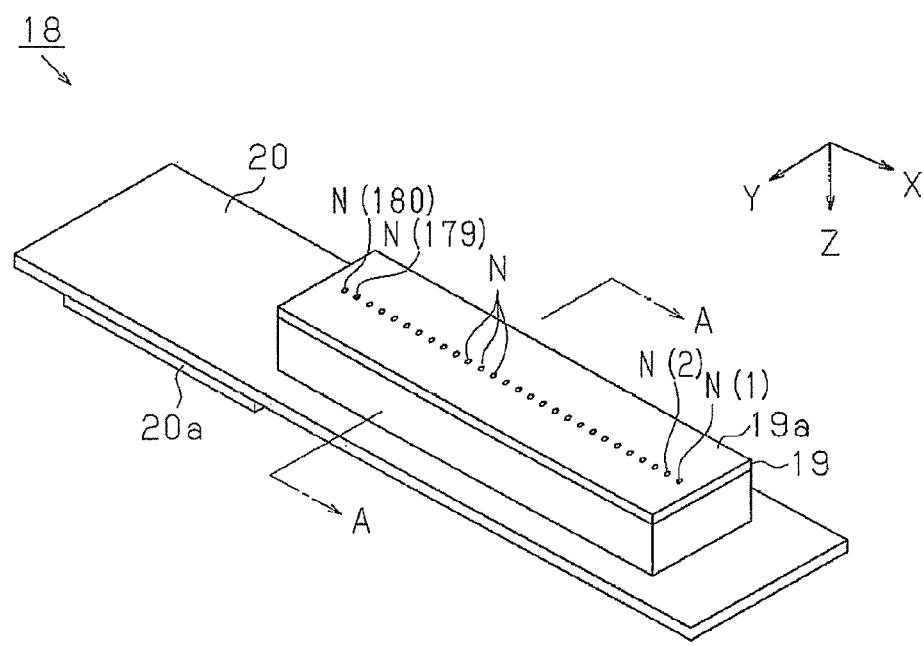
FIG. 4 is a perspective view explaining a liquid-droplets discharging head.
Figure 5:
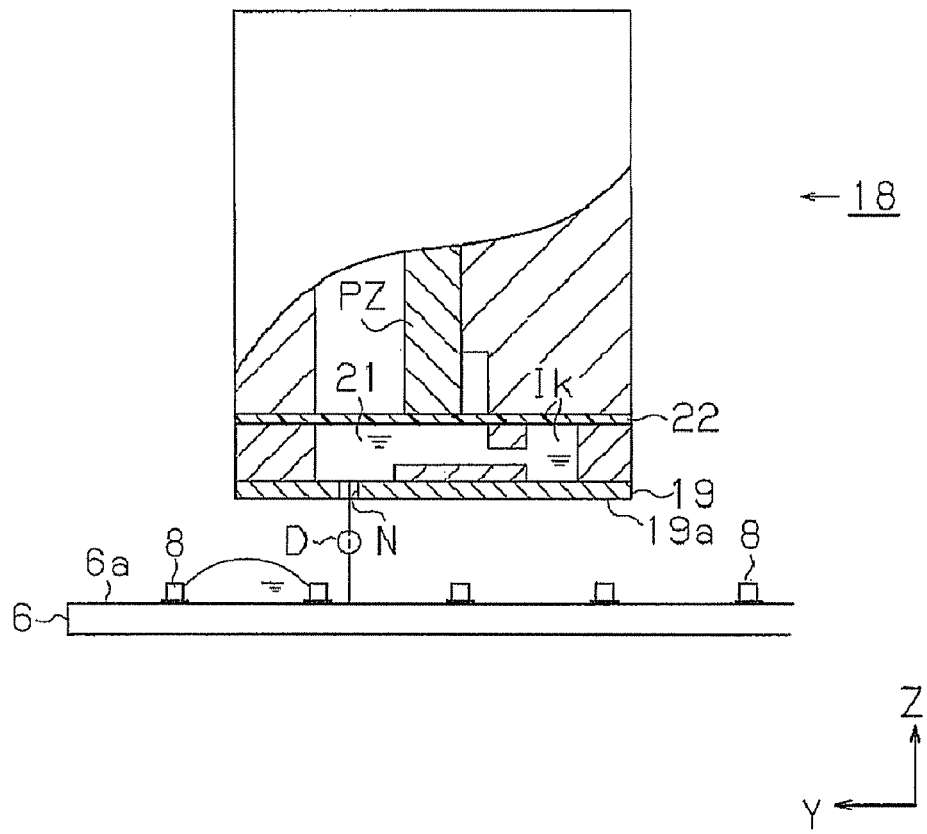
FIG. 5 is a cross sectional view explaining major parts of a liquid droplets discharging head.

FIG. 4 is a diagram of the discharging head seen from the lower side (the substrate stage 13 side.) FIG. 5 is a cross sectional view along the A-A' line in FIG. 5. As shown in FIG. 4, a nozzle plate 19 is provided on the upper surface of the discharging head 18 (the lower side in FIG. 3.) A nozzle forming surface 19a is formed on the upper surface of the nozzle plate 19 (the lower surface in FIG. 3) in parallel with the color filter substrate 6 and 180 pieces of penetrating holes (nozzle N) are formed in the nozzle forming surface 19a, penetrating through the vertical direction of the nozzle forming surface 19a. A head substrate 20 is formed under the lower side of the discharging head 18 (the upper side in FIG. 3) and an input terminal 20a is installed at the end of the head substrate 20. The input terminal 20a receives various signals for driving the discharging head 18.

Here, a Nozzle N located at the most end of the X direction is called as the first nozzle N(1) an it's number is first. Further, the second nozzle N(2), to the 179th nozzle N (179) and the 180th nozzle N (180) are placed toward the anti X arrow direction from the first nozzle N(1) in order. These nozzle's numbers are second to 179th and the 180th.

In FIG. 5, a cavity is formed on upper side of each of nozzles and connected to the ink tank 15. Ink Ik for oriented film is supplied to the cavity from the ink tank 15. The cavity 21 stores ink Ik for an oriented film and supplies it to the nozzle N corresponding to the cavity. An oscillating plate 22 oscillating up and downward is attached on the upper side of the cavity 21 and expands or shrinks the volume of the cavity 21. A piezoelectric element PZ is installed as an actuator on the upper side of the oscillating plate 22. The piezoelectric element PZ oscillates the oscillating plate 22 expanding or shrinking upward or downward when the element PZ receives signals (driving signals COM) for driving the element PZ.

When the oscillating plate 22 oscillates, the cavity 21 oscillates meniscus of the nozzle N upward or downward and make the nozzle N discharge ink Ik of which amount corresponds to the driving signals COM. A discharged droplet D flies along around the vertical line of the color filter substrate 6 and lands on the discharged surface 6a opposing the nozzle N.

Figure 6:
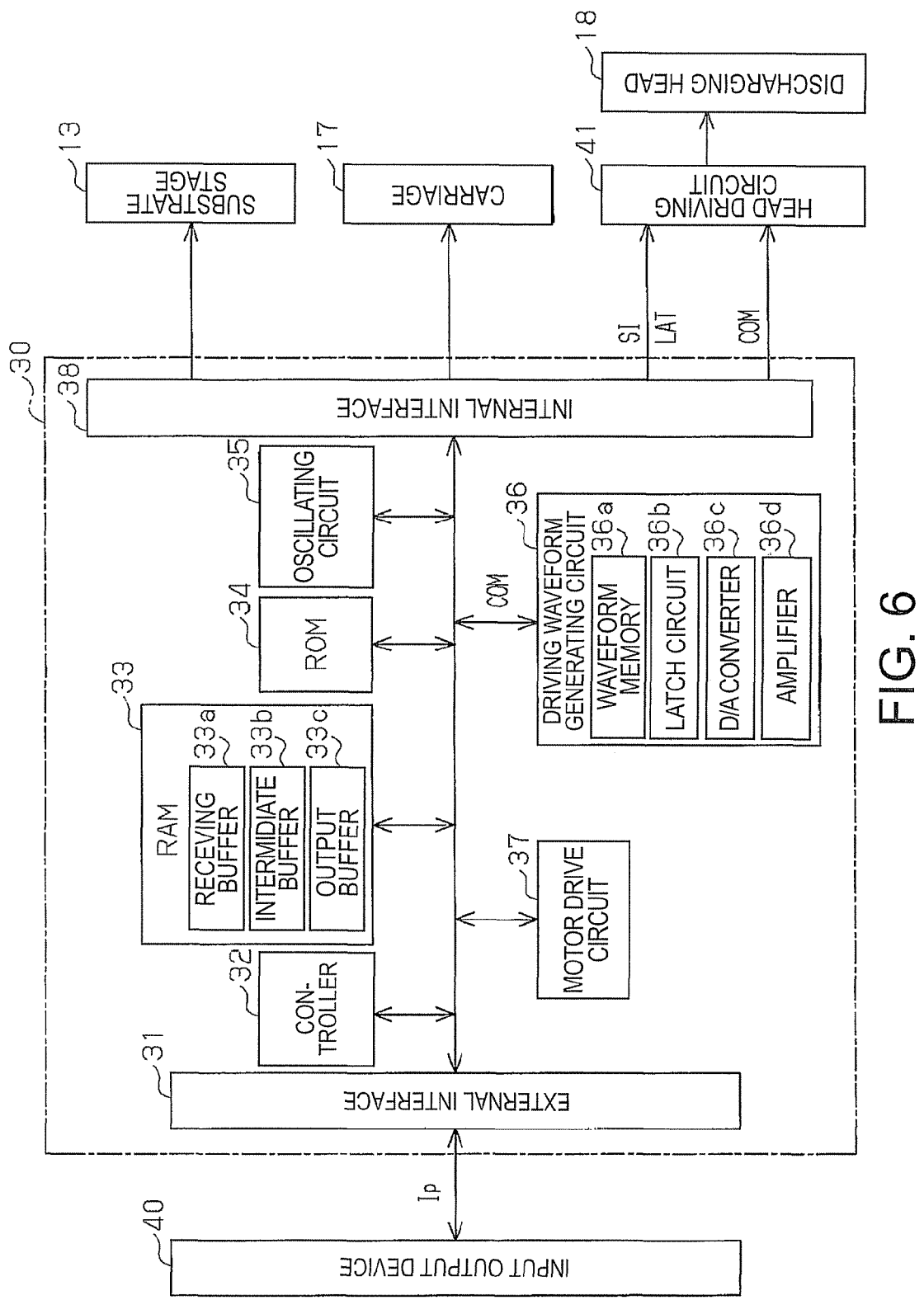
FIG. 6 shows an electrical block circuit explaining electrical structure of the liquid droplets discharging device.

Next, the electrical structure of the liquid droplet-discharging device 10 will be explained with referring to FIG. 6 to FIG. 9. FIG. 6 is a circuit block diagram showing the electrical structure of the liquid droplet-discharging device 10. In FIG. 6, a controller 30 makes the liquid droplet-discharging device 10 discharge liquid droplets. The controller 30 comprises an external interface 31 as a receiving unit, a control unit 32 including a developing unit composed of CPU, RAM 32 storing various data and composed of DRAM and SRAM, ROM 34 storing various control programs. Further, the controller 30 comprises a oscillator 35 generating clock signals, a drive signal generating circuit 36 generating the drive signals COM and outputting it, a motor drive circuit 37 scanning the substrate stage 13 and the carriage 17 and an internal interface 38. The controller 30 is connected to a input and output unit 40 via the external interface 41. The controller 30 is connected to the substrate stage 13 and the carriage 17 via internal interface 38. The controller 30 is connected to a plurality of head driving circuit 41 each of which corresponds to each of discharging head via the internal interface 38.

The input and output unit 40 is composed of external computer including CPU, RAM, ROM, a hard disk and an liquid crystal display, for example. The input and output unit 40 outputs various control signals and data to the external interface 31. These signals and data are used for driving the liquid droplet-discharging device 10 following control programs stored in ROM or a hard disk. The input and output unit 40 outputs drawing data Ip for executing liquid droplet discharging to the external inter face F31 for example. The external interface 31 receives various signals and data (drawing data Ip for example) input from the input output unit 40.

Drawing data Ip are various data for discharging a droplet D on to each position on the discharging surface 6a such as information for a position of forming the oriented film OF and thickness, and for scanning speed of the substrate stage 13.

As shown in FIG. 6, RAM 33 is used as a receiving buffer 33a, an intermediate buffer 33b, and an output buffer 33c. ROM 34 stores various control routines for executing the controller 32 and various data for executing control routines.

The oscillating circuit 35 generates clock signals synchronizing various data and driving signals. The oscillating circuit 35 generates transferring clock SCLK used for transferring various data in series for example. The oscillating circuit 35 generates latch signal (for pattern data) LAT used for converting various serial transferred data into parallel data.

Here, the state that is regulated every pulse of latch signal LAT for pattern data and the value corresponding to the numbers of pulses of latch signal LAT for pattern data are simply called as "state". A driving signal generating circuit 36 comprises a signal waveform memory 36a, a latch circuit 36b, a D/A converter 36C and an amplifier 36d. The signal waveform memory 36a corresponds waveform data for generating various driving signals COM to a predetermined address and stores them. The latch circuit 36b latches waveform data read from waveform memory by the controller 32 with a predetermined clock signal. The D/A converter 36c converts waveform data latched by the latch circuit 36b into analog signals and the amplifier 36d amplifies the analog signal converted by the D/A converter 36c and generates drive waveform signals COM. The controller 32 reads waveform data corresponding to drawing data Ip from the waveform memory 36a via the drive waveform generation circuit 36, when the input and output device 40 inputs drawing data Ip. Then, the controller 32 generates drive waveform signals COM every state via the drive waveform generation circuit 36.

The controller 32 outputs a drive control signal corresponding to the motor drive circuit 37. The motor drive circuit 37 scans the substrate stage 13 and the carriage 17 by responding drive control signals from the controller 32 via the internal interface 38.

The controller 32 makes a receiving buffer 33a temporarily store drawing data Ip received by the external interface 31. The controller 32 converts drawing data Ip into intermediate code and makes a intermediate buffer 33b store this intermediate code data. The controller 32 reads intermediated code data from the intermediate buffer 33b and develops them into dot patterns and makes the output buffer 33c store this dot pattern data.

Dot pattern data are data regarding whether each droplet D is discharged or not with corresponding to each position (each grid of dot pattern girds) on the second dimensions' drawing plane (a discharging surface 6a.) Dot pattern data are data corresponding each grid of dot pattern grids to 1 bit value ("0" or "1".) Dot pattern grids are grids partitioned by every state along the scanning direction (Y direction) of the discharging surface 6a. Further, dot pattern grids are grids partitioned by a pitch of forming nozzle N along the X direction of the discharging surface 6a. Here, every discharged region in the invention comprises a plurality of grids continuously existed.

Dot pattern data are formed based on the truth table shown in FIG. 7. Namely, when a state of a grid becomes 3 m+1, a grid corresponding to (3n+1)th nozzle N (block) is regulated by "1" and each of grids a (3n+2)th nozzle N and a third nozzle N is regulated by "0". For example, as shown in FIG. 8, when states of grids becomes "1", "4" ... "3m+1", a liquid droplet D is discharged into a region (black out region in FIG. 8) of each grid by the first nozzle N(1), the fourth nozzle N(4), the (3n+1)th nozzle N(3n+1).

Namely, when a state of a grid becomes 3 m+2, a grid corresponding to (3n+2)th nozzle N (block) is regulated by "1" and each of grids by a (3n+1)th nozzle N and a third nozzle N is regulated by "0". For example, as shown in FIG. 8, when states of grids becomes "2", "5" ... "3m+2", a liquid droplet D is discharged only into a region of each of grids by the second nozzle N(2), the fifth nozzle N(5), the (3n+2) nozzle N(3n+2).

Namely, when a state of a grid becomes 3m+3, a grid corresponding to (3n+3)th nozzle N (block) is regulated by "1" and each of grids corresponding to a (3n+1)th nozzle N and a second nozzle N is regulated by "0". For example, as shown in FIG. 8, when states of grids become "3", "6" ... "3m+3", a liquid droplet D is discharged only into a region of each of grids by the third nozzle N(3), the sixth nozzle N(6), the (3n+3) nozzle N(3n+3).

In FIG. 6, the controller 32 develops data into dot patterns corresponding to a volume for one scanning of the base substrate 13, generates serial data synchronized with transferring clock SCL by using dot pattern data, then transfers these serial data to the head driving circuit 41 in series via the internal interface 38. The controller 32 extinguishes the content in the intermediate buffer 33b after transferring these serial data corresponding one scanning amount, then develops next data into intermediate codes.

Here, serial data formed by using dot pattern data are called as serial pattern data SI as divided data. The serial pattern data SI comprises 180 bits data (data for one state) that makes each of 180 pieces of nozzles correspond to the one bit value.

Figures 9, 10, 11:
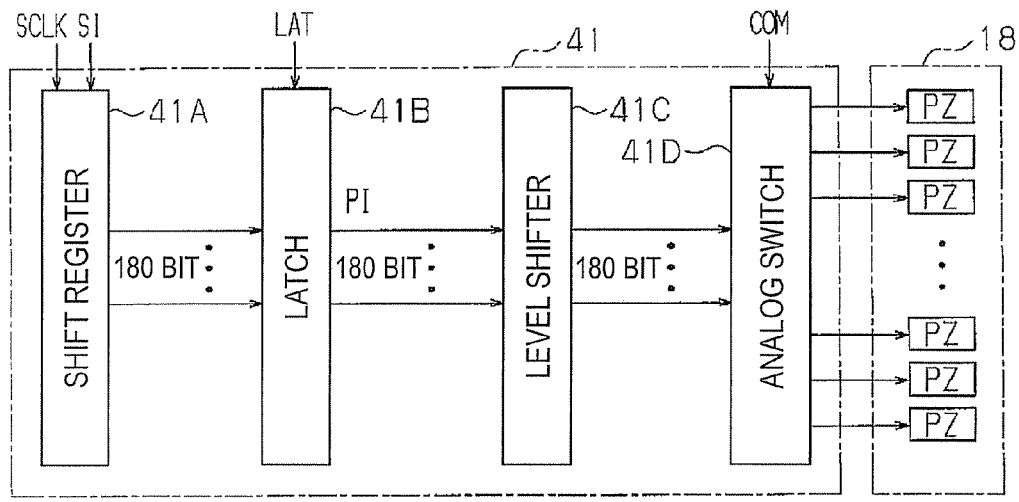
FIG. 9 shows an electrical block circuit explaining electrical structure of a head driving circuit.
FIG. 10 is a diagram explaining dot pattern data in a modification.
FIG. 11 is a diagram explaining dot pattern data in the other modification.

In FIG. 9, the head driving circuit 41 comprises a shift register 412A, a latch 41B, a level shifter 41C and an analog switch 41D. The shift register 41A shifts 180 bits serial pattern data SI in order with the transferring clock SCLK and stores the serial pattern data SI when the serial pattern data SI are transferred in series. The latch 41B latches and converts data in the shift register 41A (the serial pattern data SI) into parallel data to form parallel pattern data PI.

The level shifter 41C reads data (the parallel pattern data PI) in the latch 41B and boosts the parallel pattern data PI to the voltage level of driving an analog switch and outputs open and close signals corresponding to 180 pieces of piezoelectric elements.

The analog switch 41D includes 180 pieces of switching elements corresponding to the piezoelectric elements. Each of switch elements is opened and/or closed by open and close signals output from the level shifter 41C. Each of driving waveform signals COM is input to the input end of each of switching elements and the output end of each of switching elements is connected to the piezoelectric element PZ. Each of switching elements outputs driving waveform signals COM to the piezoelectric element PZ when the level shifter outputs the H level open and close signal.

By this signal processing, each of 180 pieces of nozzles (piezoelectric elements PZ) discharges the liquid droplet D by receiving driving waveform signals COM via the analog switch 41D if the operation of discharging the liquid droplet D is selected by the serial pattern data SI. Namely, each of nozzles N repeats the operation of discharging the liquid droplet D in the order of nozzle numbers such as (3n+1)th block, (3n+2)th block and (3n+3)th block every state.

Next, a method of manufacturing the oriented film OF using the liquid droplet-discharging device 10 will be explained. As shown in FIG. 3, first, the color filter substrate 6 is mounted on the substrate stage 13 with setting the discharging surface 6a upward. At this time, the substrate stage 13 places the color filter substrate 6 toward the reversed direction of the arrow Y of the carriage 17. Under this state, the input and output device 40 inputs drawing data Ip into the control device 30.

The controller 30 scans the carriage 17 via the motor drive circuit 37 and places the carriage 17 so as to pass each of discharging heads 18 above the color filter substrate 6 when the color filter substrate 6 is scanned toward the Y direction. The controller 30 starts scanning the substrate stage 13 via the motor drive circuit when placing the carriage 17.

The controller 30 develops drawing data Ip input from the input and output device 40 into dot pattern data. At this time, the controller 30 generates dot pattern data according to the truth table shown in FIG. 7. Namely, the controller 30 regulates the grid corresponding to (3n+1)th nozzle(block) to be "1" when the state of the grid becomes (3 m+1) and regulates other grids to be "0". Further, the controller 30 regulates the grid corresponding to (3n+2)th nozzle(block) to be "1" when the state of the grid becomes (3 m+2) and regulates other grids to be "0". Further, the controller 30 regulates the grid corresponding to (3n+3)th nozzle(block) to be "1" when the state of the grid becomes (3 m+3) and regulates other grids to be "0".

When the controller 30 develops dot pattern data corresponding to an amount of one scan of the substrate stage 13, it generates serial pattern data SI by using dot pattern data, synchronizes serial pattern data SI with transferring clock SCLK and transfers these data to the head driving circuit 41 in series.

When the substrate stage 13 reaches the predetermined position of starting drawing, the controller 30 starts outputting the latch signal LAT for pattern data and switches a state from "0" to "1", "2", "3", and "4". Further, the controller 30 generates the driving waveform signal COM synchronized with the latch signal LAT for pattern data via the driving waveform generating circuit 36 and outputs the driving waveform signal COM every state.

The controller 30 converts serial pattern data SI transferred every state in series into parallel data via the head driving circuit 41 and generates open and close signals for opening and closing each switch element. Then, the controller 30 drives a nozzle allocated as the (3n+1)th block to discharge the liquid droplet D via the head driving circuit 41 when the state becomes (3 m+1), and drives a nozzle allocated as the (3n+2)th block to discharge the liquid droplet D when the state changes to (3m+2). Further, the controller 30 drives a nozzle allocated as the (3n+3)th block to discharge the liquid droplet D via the head driving circuit 41 when the state becomes (3m+3).

Technical advantages of the embodiment are followings. 1) According to the above embodiment, the controller 32 develops drawing data Ip input from the input and output device 40 into dot pattern data. At this time, the controller 32 regulates dot pattern grid partitioned by every state along the scanning direction of the discharging surface 6a and corresponds each grid of dot pattern grids to "discharge" or "not discharge". Then, the controller 32 regulates the grid corresponding to (3n+1)th nozzle(block) to be "1" when the state of the grid becomes (3m+1) and regulates other grids to be "0" according to the truth table shown in FIG. 7. Further, the controller 32 regulates the grid corresponding to (3n+2)th nozzle(block) to be "1" when the state of the grid becomes (3m+2) and regulates other grids to be "0". Further, the controller 32 regulates the grid corresponding to (3n+3)th nozzle(block) to be "1" when the state of the grid becomes (3m+3) and regulates other grids to be "0".

Therefore, each block is driven by different state and discharges the liquid droplet D into each of different discharged regions partitioned along the scanning direction. As the result, overlapping discharging timing for each nozzle N can be reduced by amount of block numbers. Namely, fluctuation of discharging amount due to overlapping discharging timing can be constrained. Hence, amount of discharging droplets every nozzle N can be uniformed, improving thickness uniformity of the oriented film OF made of liquid droplets D.

2) Each of three nozzles located adjacently each other is allocated into each of three different blocks. Such dividing can certainly avoid cross talk among nozzles. 3) Further, the controller 32 develops drawing data Ip into dot pattern data. Hence, usability of the droplet-discharging device 10 can be further improved, compared to a case of generating patterned data with a separated outside device.

Here, the above embodiment may be modified as following. In the above embodiment, three nozzles located adjacently each other are allocated to three different blocks. But, two nozzles located adjacently may be allocated to different two blocks. Namely, as shown in FIG. 10, the grid corresponding to (2n+1)th nozzle(block) may be regulated as "1" when the state of the grid becomes (2m+1) and other grids may be regulated as "0". Further, the grid corresponding to (2n+2)th nozzle(block) may be regulated as "1" when the state of the grid becomes (2m+2) and other grids may be regulated as "0".

Otherwise, four nozzles located adjacently may be allocated into four different blocks and each nozzle may be allocated to each block. Namely, as shown in FIG. 11, the grid corresponding to (4n+1)th nozzle(block) may be regulated as "1" when the state of the grid becomes (4m+1) and other grids may be regulated as "0". Further, the grid corresponding to (4n+2)th nozzle(block) may be regulated as "1" when the state of the grid becomes (4m+2) and other grids may be regulated as "0". Further, the grid corresponding to (4n+3)th nozzle(block) may be regulated as "1" when the state of the grid becomes (4m+3) and other grids may be regulated as "0". Further, the grid corresponding to (4n+4)th nozzle(block) may be regulated as "1" when the state of the grid becomes (4m+4) and other grids may be regulated as "0".

In the above embodiment, an actuator is a piezoelectric element PZ. But it is not limited to this element, a resistive heating element instead, for example, or any other elements discharging a liquid droplet D by receiving the predetermined driving waveform signal COM.

In the above embodiment, each discharging head 18 includes 180 pieces of nozzles N aligned along one column. But this is not limited to this alignment, each discharging head 18 may include 180 pieces of nozzles N aligned along more than and equal to two columns. Otherwise, the head may include nozzles N of which numbers are more than 180 pieces.

In the above embodiment, an electro optic device is the liquid crystal device 1, including the oriented film OF manufactured with the liquid droplet D. But, it is not limited to this, the device may be the liquid crystal device 1 including the color filter manufactured with the liquid droplet D. Otherwise, the device may be an electroluminescent display, including luminance elements manufactured with the liquid droplet D.

The entire disclosure of Japanese Patent Application No. 2006-325279, filed Dec. 1, 2006 is expressly incorporated by reference herein.

What is claimed is:

1. A liquid droplet-discharging device comprising:
    a droplet-discharging head having a plurality of nozzles that are arranged in a predetermined direction and discharge liquid droplets;
    a scanning unit for relatively moving the droplet-discharging head and a substrate toward a scanning direction:
    a controller including a memory for memorizing pattern data corresponding to driving nozzles that are selected from the plurality of nozzles in each of a plurality of discharged regions, the memory partitioning a drew region of the substrate into the plurality of discharged regions for every discharging frequency state M along a scanning direction of the substrate;
    a transferring unit for developing the patterned data memorized by the memory into a plurality of data to be divided and transferring the divided data to the liquid droplet-discharging head in order; and
    an output unit for outputting a driving signal that drives a driving nozzle selected by the divided data to discharge the liquid droplets,
    wherein the patterned data is data that allocates the plurality of nozzles to a plurality of blocks, and corresponds each of the plurality of blocks to each of the plurality of discharging regions,
    the patterned data is data that allocates nozzles located adjacent to each other to different blocks designated as (3N+1), (3N+2), and (3N+3) where N is an integer more than or equal to zero and makes each of the plurality of blocks correspond to each of the plurality of discharged regions;
    the controller regulates the plurality of nozzles associated with a respective block designated as (3N+1) to discharge when the discharging frequency state becomes (3M+1) where M is an integer more than or equal to zero and regulates the remaining nozzles to not discharge;
    the controller regulates the plurality of nozzles associated with a respective block designated as (3N+2) to discharge when the discharging frequency state becomes (3M+2) and regulates the remaining nozzles to not discharge;
    the controller regulates the plurality of nozzles associated with a respective block designated as (3N+3) to discharge when the discharging frequency state becomes (3M+3) and regulates the remaining nozzles to not discharge.

2. The liquid droplet-discharging device according to claim 1, further comprising:
    a receiving unit for receiving drawing data from an external computer; and
    a developing unit for developing the drawing data received by the receiving unit into the patterned data.

3. An electro optic device including a thin film formed by drying a discharged liquid droplet, wherein
    the thin film is formed by the liquid droplet-discharging device according to claim 1.

* * * * *